Dec. 20, 1966     W. F. KLEMM     3,293,515

LONG TRAVEL LINEARLY RECIPROCATING ELECTRIC MOTOR

Filed Sept. 24, 1963     4 Sheets-Sheet 1

INVENTOR.
WILLIAM F. KLEMM

BY
ATTORNEY

INVENTOR.
WILLIAM F. KLEMM
BY
*William P. Sewald*
ATTORNEY

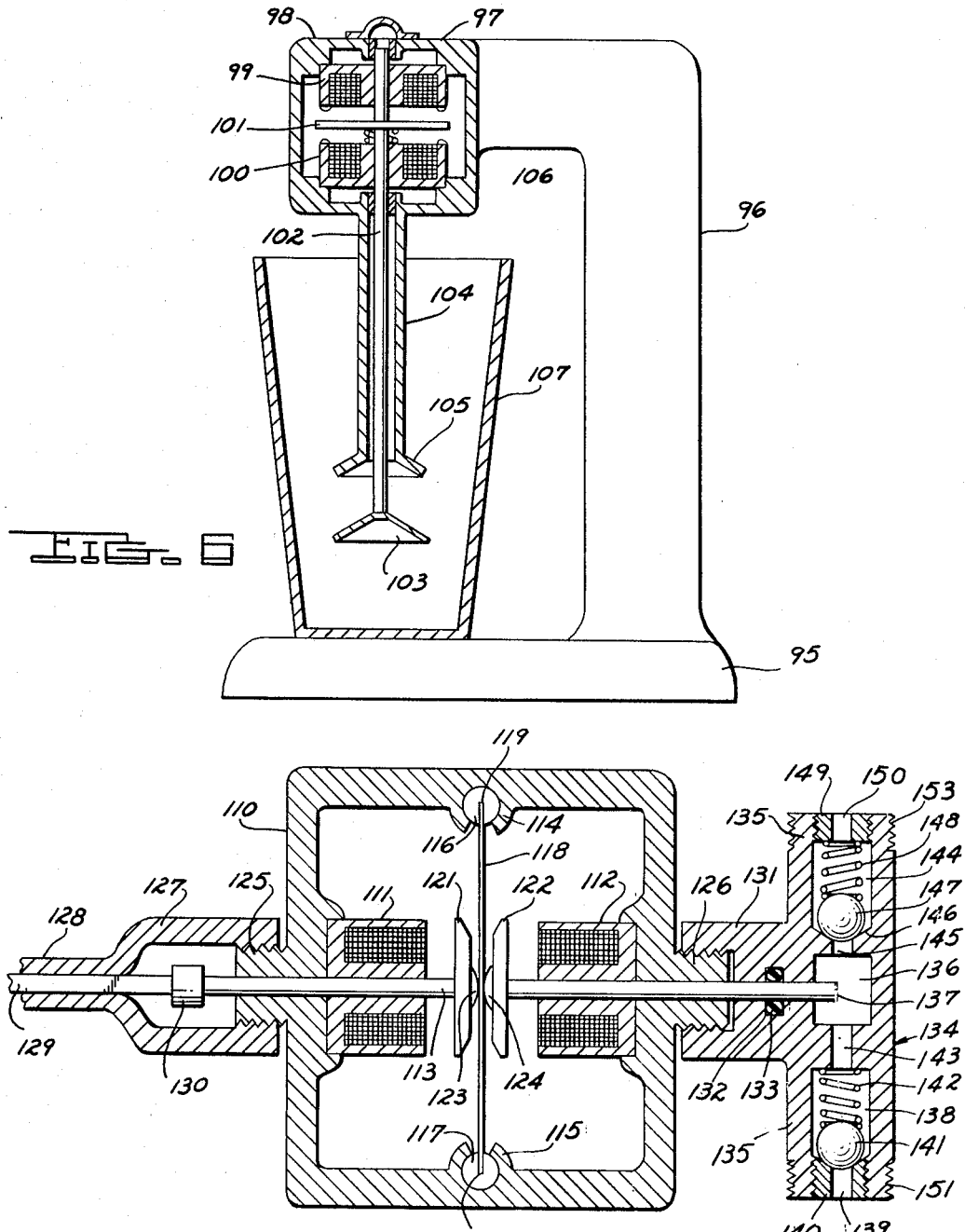

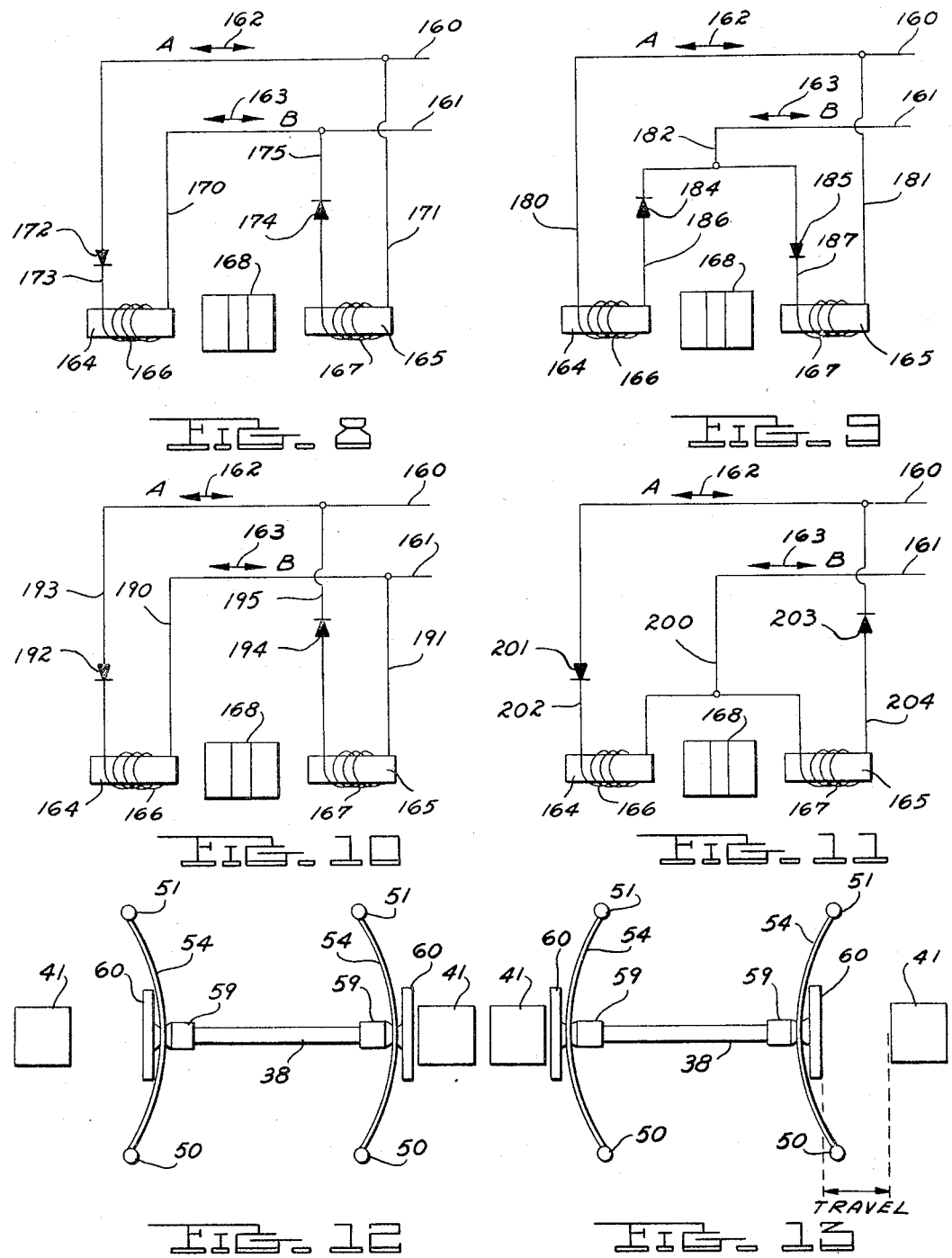

United States Patent Office 3,293,515
Patented Dec. 20, 1966

3,293,515
LONG TRAVEL LINEARLY RECIPROCATING ELECTRIC MOTOR
William F. Klemm, 17570 Prairie Ave., Detroit, Mich. 48221; John F. Langs, administrator of said William F. Klemm, deceased
Filed Sept. 24, 1963, Ser. No. 311,050
3 Claims. (Cl. 318—37)

This invention relates to electric motors of the linear motion type capable of long travel, to electrical circuits therefor, to be bi-directional energy loading and unloading spring suspensions used in conjunction therewith, and to adjustable resilient bumpers for tuning the termination and initiation of reciprocation at the ends of motion in both directions.

Various vibratory and oscillatory electric motors have been employed in the prior art; however, their use and operation has been adapted to vibrating test machines and other vibrating mechanisms such as sanders and similar items. Their shortness of stroke has been recognized in some applications by using a lever arm which, while it lengthens the stroke, reduces the power available rendering the device inefficient.

With the foregoing in view, the primary object of the invention is to provide paired opposed electromagnets or solenoids reacting with a common armature or inter-connected paired armatures wherein one electromagnet moves the armature in one linear direction and the other electromagnet moves the armature sequentially in the opposite linear direction.

An object of the invention is to provide a circuit which alternately energizes the opposed electromagnets each time the direction of current changes in alternating current thereby providing an electrical system which automatically sequentially alternately energizes the electromagnets and de-energizes the electromagnets oppositely relative to one another.

An object of the invention is to provide one-way electrical valves in the electric circuit such as resistors, diodes, rectifiers and the like, so that in one direction of alternating current flow one electromagnet is selectively energized whereas, in the opposite direction of alternating current flow the opposite magnet is selectively energized automatically.

An object of the invention is to provide novel energy loading and unloading spring suspensions for compensating the variable power characteristics of the electromagnets and armatures over variable armature-electromagnet spacing so that the springs are loaded during periods of maximum power and unloaded during periods of minimum power thereby leveling out the power characteristics of the electric motor over its entire linear stroke in both directions.

An object of the invention is to provide resilient suspensions and/or sliding supports for the springs so that they may move with the reciprocating parts of the electric motor without interfering with linear movement.

An object of the invention is to provide extensibly adjustable resilient bumpers adjacent the ends of travel of the reciprocating members of the electric motor so that they may be tuned relative to the reciprocating members at the point of change in direction of linear movement.

An object of the invention is to provide adjustable means for positioning the magnets, adjustably positioning the springs, and adjustably positioning the resilient bumpers so that the entire motor may be adjusted for the work load imposed thereon under working conditions.

These and other objects of the invention will become apparent by reference to the following description of the novel linearly reciprocating electric motor embodying the invention taken in connection with the accompanying drawings in which:

FIG. 6 is a vertical cross-sectional view of a mixing machine showing the disposition of a modified novel motor embodiment therein in cross section.

FIG. 7 is a cross-sectional view of a modification of the novel motor incorporated in a housing shown in conjunction with a displacement pump and a reciprocating tool such as a riveting hammer.

FIGS. 8, 9, 10, and 11 are schematic wiring diagrams showing the control circuit, electromagnets, and one-way electrical valves.

FIG. 12 is a schematic view of the reciprocating parts of the novel electric motor showing the reciprocating members at one end of travel; and FIG. 13 is a view similar to FIG. 11 showing the reciprocating members at the opposite end of travel.

Figure 4:
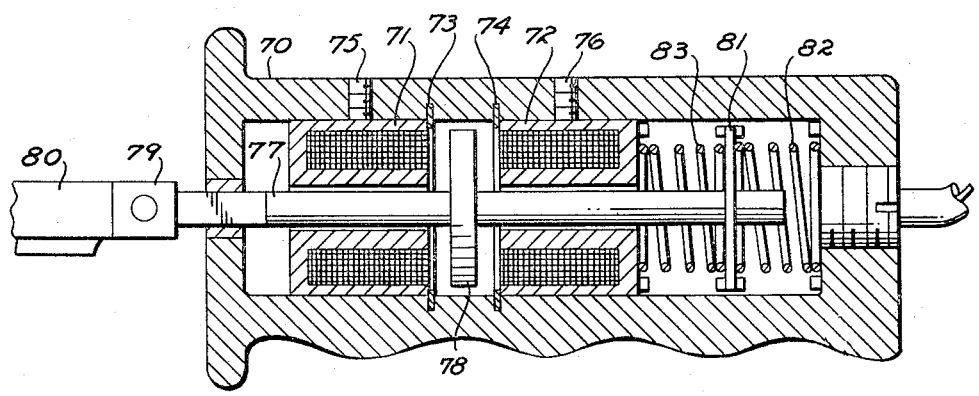
FIG. 4 is a longitudinal cross-sectional view of a reciprocating tool such as a carving knife showing a modification of the novel motor.
Figure 5:
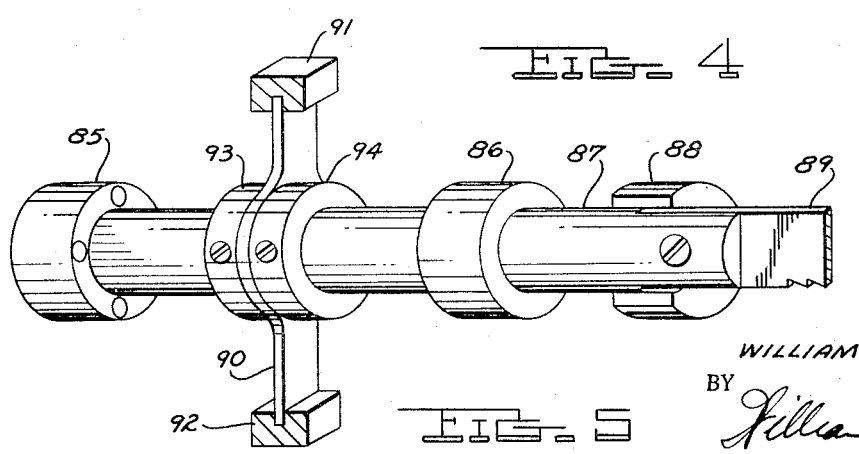
FIG. 5 is a schematic view of a solenoid embodiment of the novel motor.

Referring now to the drawings wherein like numerals refer to like and corresponding parts throughout the several views, the long travel linearly reciprocating electric motors disclosed therein to illustrate the invention have electromagnets or solenoids in spaced opposed relation to one another. An armature lies between the electromagnets. The electromagnets move the armature in opposite directions of linear reciprocating travel. The armature may be a single armature as seen in FIGS. 4 and 5 or it may be a double armature and interconnected by a link as seen in the remaining figures. The link may be slidably supported as seen in FIGS. 4, 5, and 6 and support the armature, or the link may be resiliently suspended such as seen in the remaining figures.

An electrical circuit is provided which is powered by alternating current. Alternating current travels in one direction and in the opposite direction alternately as well understood in the art. The circuit includes the coils of the electromagnets.

Electrical one-way valve devices such as rectifiers, diodes, transistors, and the like are connected in the circuit to connect power sequentially to one electromagnet or solenoid at one time and to the other electromagnet or solenoid at another time. One valve feeds current to one electromagnet while the other valve blocks current to the other electromagnet during one direction of alternating current flow. Conversely in the other direction of alternating current flow the one valve blocks current to the one electromagnet while the other valve feeds current to the other electromagnet. Thus one electromagnet is energized each time the alternating current reverses its direction of travel. Thus the armature and motion take-off link will be electrically driven in opposite directions at the rate of the alternating current as it reverses direction.

The armature and link are driven sequentially in one linear direction of reciprocation by one electromagnet when energized by one direction of alternating current flow and driven by the second electromagnet in the opposite linear direction in the opposite direction of alternating current flow. Thus the motor is not dependent on mechanical means to effect travel in one direction which means must be weaker than the electrical drive in the other direction to permit loading. The mechanically returned motors thus overload the electrical drive. They also stall easily as the low power of the mechanical means is easily overcome by loads and no return occurs.

Since the device is automatically electrically driven in opposite reciprocating directions by a single source of alternating current supply as controlled by the one-way valves of the circuit, it is not dependent on mechanical return and therefore has maximum resistance against stalling. In the operation of the novel motor, as an armature travels toward an energized electromagnet, it moves from a position remote to a position proximate to the electromagnet. Thus at the initiation of its reciprocating movement in one direction, its initial movement is relatively low powered and its final movement is relatively high powered. This applies in both directions as the armature reciprocates between the opposed electromagnets.

To compensate the variable response of the armature to the electromagnet and to counter-balance inertia and momentum, resilient spring members are provided which are loaded and unloaded in the reciprocating travel of the armature and motion take-off link.

In the initial portion of travel towards a presently energized electromagnet, the resilient members previously have been loaded by the responsive motion of the armature to the previously energized electromagnet. Thus in the initial travel of the armature towards the presently energized electromagnet, the resilient member unloads stored energy and supplements the low response due to the remoteness of the armature from the presently energized electromagnet. In the final travel of the armature towards the presently energized electromagnet, the resilient member is spring loaded. The loading occurs during this time of maximum armature-electromagnet response. Thus energy is absorbed in the final travel of the armature towards electromagnet and released in the initial travel of the armature toward the electromagnet thereby effecting counter-balancing by supplementing the energy during the time and position of low response and absorbing energy during the time and position of high response.

Resilient or elastic bumpers such as rubber plugs are adjustably positioned adjacent the ends of travel of the armature and motion take-off link at both ends of reciprocating movement. These bumpers supplement the energy storing and unloading characteristics of the resilient members and prevent over-travel of the armature, effect resilient deceleration of the armature and motion take-off link, and effect resilient acceleration of the armature and motion take-off link. Due to the fact that the resilient or elastic bumpers are adjustable as to extension they may be positioned at a desirable point of travel of the armature and motion take-off link.

The bi-directionally electrically driven motor and counter balancing resilient means may be employed in any type of device in which a powered reciprocating stroke is used. Some exemplary devices are shown in the drawings.

Figure 1:
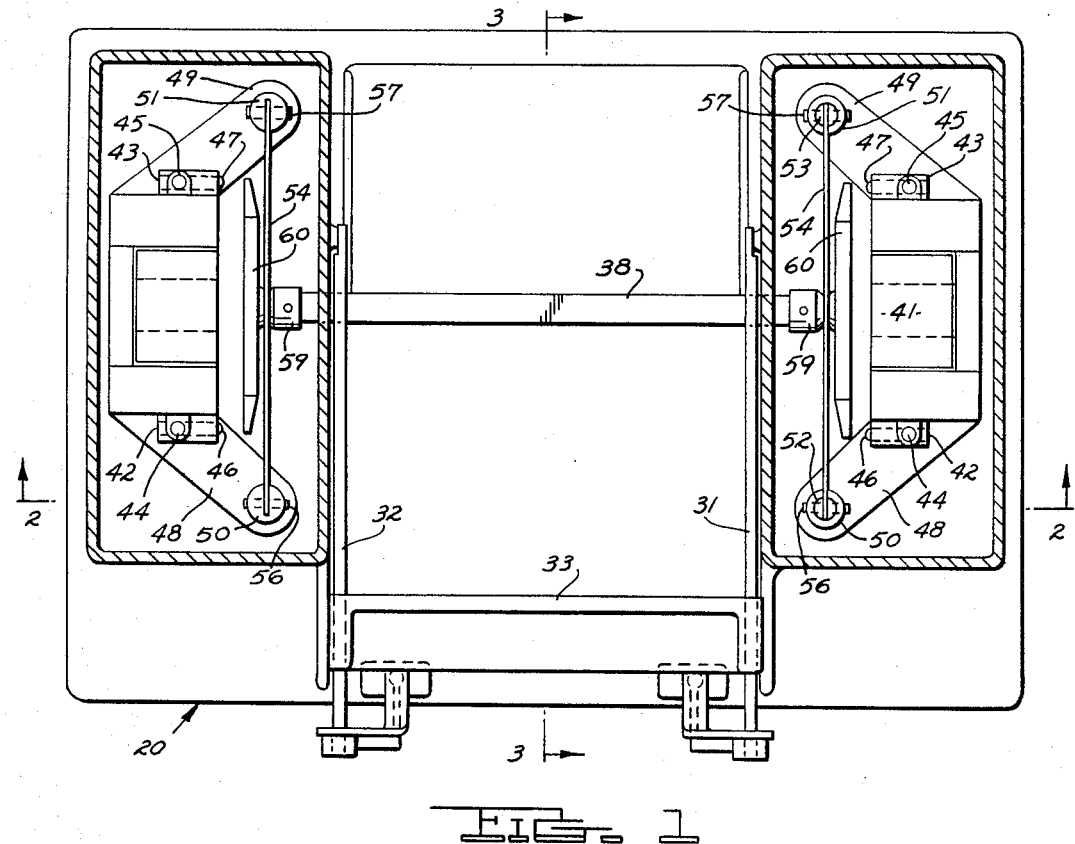
FIG. 1 is a top plan view of the device shown in FIG. 2, with parts broken away and partly in cross-section, showing the electric motor of the invention incorporated in a slicing machine.
Figure 2:
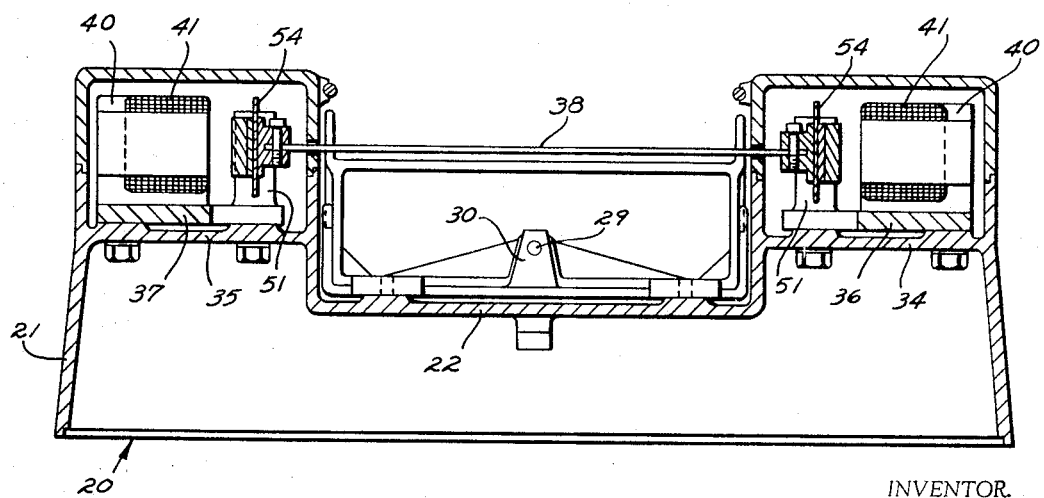
FIG. 2 is a cross-sectional view of the device seen in FIG. 1 taken on the line 2—2 thereof.
Figure 3:
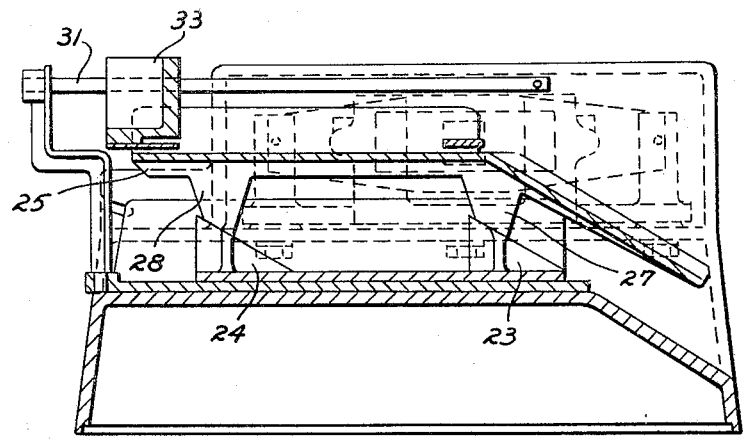
FIG. 3 is a cross-sectional view of the device seen in FIG. 1 taken on the line 3—3 thereof.

Referring now to the device of FIGS. 1, 2, and 3, a slicing machine 20 has a frame or chassis 21 with a low central portion 22 supporting a pair of table elevator cams 23 and 24, FIG. 3. A table 25 lies over the low portion 22 and has mating elevator cams 27 and 28. A lead screw 29 threaded in a boss 30 fixed on the chassis 21, FIG. 2, is adapted to move the table 25 forwardly and rearwardly. In the forward movement the cams lower the table. In the rearward movement the cams raise the table. Slide bars 31 and 32, FIG. 1, are fixed on the chassis 21 and slidably support a pusher plate 33 above the table 25.

The chassis 21 is equipped with a platform 34 and a platform 35 on either side of the low central portion 22. The novel electric motor is mounted on and between the platforms 34 and 35 and will now be described.

The electric motor comprises a pair of like assemblies 36 and 37 bolted to the platforms 34 and 35 respectively. The assemblies 36 and 37 are reversely positioned relative to one another so that they are opposed and the assemblies are interconnected by a motion take-off link 38 which in this instance is also a knife blade.

Each assembly 36 and 37 comprises an electromagnet 40 including the usual pole pieces and coil 41. A pair of sockets 42 and 43 are positioned on either side of each electromagnet 40. The sockets 42 and 43 are equipped with adjusting screws 44 and 45 which hold the adjusted extending position of resilient bumpers 46 and 47 contained in the sockets 42 and 43 respectively. Each assembly 36 and 37 carries a pair of arms 48 and 49 respectively supporting a pair of posts 50 and 51. The posts 50 and 51 are hollow. A slotted resilient bushing 52 lies in the hollow post 50 and a slotted resilient bushing 53 lies in the hollow post 51. A leaf spring 54 lies between the bushings 52 and 53 in the posts 50 and 51. Pins 56 and 57 extend through the posts and bushings. The spring 54 has longitudinal slots receiving the pins 56 and 57.

It can now be understood that the spring 54 may flex toward and away from the electromagnet 40 as its ends are floatingly suspended to flex the rubber bushings 52 and 53 and floatingly suspended relative to the pins 56 and 57 through the slots in the ends of the spring 54. The pins 56 and 57 support the spring 54 relative to the vertical. The bushings and posts position the spring 54 in the transverse direction.

An adaptor 59 connects through the spring 54 and supports an armature 60 adjacent the electromagnet 40. The motion take-off link or blade 38 is interconnected between the connectors 59. It can now be seen that armatures 60 adjacent each electromagnet 40 are spring suspended on the springs 54 and move together in opposite reciprocating directions through the interconnection effected by the motion take-off link or blade 38.

FIGS. 12 and 13 diagrammatically illustrate the spring suspended travel of the armature 60 between the coils 41 of the device seen in FIGS. 1–3. FIG. 12 shows the right hand coil 41 energized so as to attract the adjacent armature 60 moving it to a point adjacent the energized coil 41 with the springs 54 flexed permitting the movement of the armature to the right hand side. The movement of the armature 60 to a point adjacent the right hand coil 41 moves the armature 60 at the left hand side of the drawing through the link 38 to a point remote from the un-energized left hand coil 41. FIG. 13 illustrates the opposite condition wherein right hand coil 41 is not energized and left hand coil 41 is energized. This attracts the left hand armature 60 to a position proximate to the left hand coil and causes the right hand armature to move through the link 38 to a position remote from the right hand coil 41. As the right and left hand coils 41 are alternately and oppositely energized and de-energized the motion take-off link 38 is reciprocated rapidly between the positions illustrated in FIGS. 12 and 13 and the relative travel of the link is indicated by the extended dotted lines in FIG. 13.

A circuit including electrical one-way valves alternately energizes and de-energizes the right and left hand coils oppositely relative to one another to cause the travel of the armatures and motion take-off link and to flex the springs as seen in FIGS. 12 and 13. Suitable circuits are schematically shown in FIGS. 8–11 and are described hereinafter.

The device of FIG. 4 illustrates an embodiment of the novel motor wherein reciprocating motion is taken off at one side of both electromagnets and wherein spring counter balancing is applied at one side of both electromagnets. Both motion take-off and counter balancing may be on the same side of the electromagnets or on opposite sides as shown.

The hollow housing 70, which may be a handle as shown, houses a pair of opposed electromagnets 71 and 72. A pair of rings 73 and 74 abut the electromagnets 71 and 72 respectively spacing them apart. A pair of set screws 75 and 76 hold the electromagnets against the rings 73 and 74. The electromagnets 71 and 72 have a hollow bore receiving a motion takeoff link 77 which extends endwise outwardly of each electromagnet. An armature 78 lies between the electromagnets 71 and 72 and is fixed on the motion take-off link 77.

The motion take-off link 77 has an adaptor 79 at one end for connection with a tool such as the knife 80 or other items as desired. The other end of the link 77 has a disc flange 81. A coil spring 82 abuts one end of the housing 70 and the flange 81. A coil spring 83 abuts the disc flange 81 and the electromagnet 72 or other abutment. The springs 82 and 83 are in opposition.

The springs 82 and 83 are shown at a neutral or rest position with the position of the disc flange 81 and the length of the motion take-off link 77 locating the armature 78 midway between the electromagnets 71 and 72.

In operation, the electromagnets are alternately energized to alternately attract the armature 78 and cause it to move towards the energized electromagnet. This causes the motion take-off link 77 to reciprocate linearly which motion is transmitted to the knife 80 and the disc flange 81.

Movement of the armature 78, link 77, and the flange 81 to the left loads the spring 83. Movement of the armature 78, link 77, and flange 81 to the right loads the spring 82.

Upon the electromagnet 71 being energized the spring 83 is spring loaded. Upon the electromagnet 71 being de-energized the spring 83 unloads moving the flange 81, link 77 and armature 78 to the right in conjunction with the attraction of the electromagnet 72 which is now energized. The unloading occurs during the initial movement of the armature to the right to the neutral position illustrated and farther movement to the right loads the spring 82.

When the electromagnet 72 is de-energized the spring 82 unloads moving the flange 81, link 77, and armature to the left in conjunction with the attraction of the electromagnet 71 which is now energized. The unloading occurs during the initial movement of the armature 78 to the left to the neutral position illustrated and farther movement to the left loads the spring 83.

The operation of the device of FIG. 4 will be understood from the operation of the device of FIGS. 1–3. It is to be noted particularly that the rings 73 and 74 may be removed and the location of the electromagnets fixed by the set screws 75 and 76. Thus the spacing between the electromagnets 71 and 72 variably adjusts. Also the neutral position of the armature and the spring effect may be varied by changing the position of the electromagnets. Also the springs may be adjusted by moving the electromagnets as they constitute means therefor. Obviously other adjustable means may be employed to variably adjust the springs such as spacers, screws, and movable housing portions. This is true of all the novel motor embodiments.

The motor of FIG. 5 is similar to that of FIG. 4 in structure and operation. A solenoid coil 85 lies spaced from a solenoid coil 86 and they surround a combined armature and motion take-off link 87 which terminates at one end in an adapter 88 for connection to a tool or other item such as a hack-saw blade 89. A leaf-spring 90 is suspended between a housing portion 91 and a housing portion 92 and is connected to the armature link 87 by a pair of clamp rings 93 and 94. The spring 90 is connected to the armature link 87 in the central portion of the spring 90. In FIG. 5, the motor is shown in the neutral or rest position and the operation of the device will be understood from the operation of the devices of FIGS. 1–4. Here the clamp rings and spring are adjustable relative to the armature to vary the armature and/or the springs relative to the electromagnets.

FIG. 6 shows a device incorporating the novel motor in an appliance wherein a base 95 supports a stand 96. The stand 96 has a housing 97 enclosing a motor 98. The motor 98 is vertically positioned with an electromagnet 99 facing downwardly and an electromagnet 100 facing upwardly in spaced relation to each other. An armature 101 lies between the electromagnets 99 and 100. A motion take-off link 102 extends through the electromagnets 99 and 100 and is connected to the armature 101. The link 102 extends downwardly and terminates in a dasher head 103. A sleeve 104 fixed on the housing 97 surrounds the extended portion of the link 102 and terminates in a dashpot flange 105.

A spring 106 lies between the electromagnet 100 and the armature 101 resiliently supporting the armature 101, link 102, and head 103 relative to gravity so as to position the armature 101 midway between the electromagnets 99 and 100 in the neutral or rest position. A liquid container 107, rests on the stand 95 and surrounds the flange 105 and head 103. Rapid reciprocation of the head 103 relative to the stationary flange 105 mixes the liquid in the container 107.

In the operation of the device of FIG. 6, the spring 106 is spring loaded when the bottom electromagnet 100 is energized. When the bottom electromagnet is de-energized, the spring 106 urges the armature 101, link 102, and head 103 upwardly in conjunction with the now energized top electromagnet 99. This compensates for gravity resisting upward movement. However, in downward movement upon the top electromagnet being de-energized, gravity urges the armature 101, link 102, and head 103 downwardly in conjunction with the now energized bottom electromagnet 100.

In the motors of FIGS. 4 and 6, each electromagnet has pole pieces formed of concentric spaced inner and outer tubular cylinders interconnected by a bottom plate. The inner cylinder has a thick wall and the outer cylinder has a thin wall. The mass of the inner and outer rings is thus equalized resulting in pole pieces of equal mass. The electromagnets have an E-shape in cross-section.

In the novel motor embodiment of FIG. 7, a housing 110 encloses a pair of spaced opposed electromagnets 111 and 112. The electromagnets 111 and 112 have a hollow bore slidably supporting a motion take-off link 113 which extends endwise outwardly of the housing 110. A pair of open sided sockets 114 and 115 formed integrally with the housing 110 position a pair of slotted bushings 116 and 117 respectively. A leaf spring 118 has outer ends 119 and 120 lying in the slots of the bushings 116 and 117 and sockets 114 and 115 respectively. The bushings 116 and 117 may be of resilient material and flex with spring 118 movement or may be of stiff material and pivot relative to the sockets 114 and 115 with spring 118 movement. In either case the ends 119 and 120 of the spring are capable of moving angularly and longitudinally in conjunction with spring flexing.

The spring 118 extends across the plane of the link 113 and has an aperture receiving the link 113. A pair of armatures 121 and 122 are fixed on the link 113 on either side of the spring 118 and a pair of spacer buttons 123 and 124 lie between the spring 118 and the armatures 121 and 122 respectively. The buttons 123 and 124 have an arcuate surface abutting the spring 118 so as not to interfere with the flexing of the spring 118.

The housing 110 has threaded bosses 125 and 126 at either side surrounding the extension of the link 113 providing a connector-adaptor for mounting tools and devices on the housing 110 in connection with the motor.

A head 127 is threaded on the boss 125 and has a sleeve 128 slidably supporting a rod 129 united with the link 113 by a connector 130. The rod 129 may be a hammer shank or any other tool or device utilizing reciprocating motion.

A head 131 is threaded on the boss 126 and has an internal chamber 132 containing an O-ring 133 which seals off the link 113 and head 131 relative to a displacement pump 135.

The displacement pump 134 has a housing 135 integral with the boss 131. The housing 135 has a central displacement chamber 136 into which an outer end 137 of the link 113 reciprocates. An inlet chamber 138 has an inlet orifice 139 in a valve seat 140 against which a check valve ball 141 is displaceably urged by a spring 142. The inlet chamber communicates with the displacement chamber through a channel 143.

The housing 134 has an outlet chamber 144 communicating with the displacement chamber 136 by a channel 145 which leads past a valve seat 146 against which a check valve ball 147 is displaceably urged by a spring 148 abutted by a stop 149 having an outlet orifice 150. The housing 134 has threaded ends 151 and 152 for connecting to hoses or pipes furnishing liquid supply and leading to delivery.

Upon the link 113 moving to the left, its end 137 and adjacent mass move out of the displacement chamber 136 evacuating the chamber 136 whereupon liquid is delivered through the supply orifice 139 past the seat 140 and ball 141 through the chamber 138 and channel 143 to the displacement chamber 136.

Upon the link 113 moving to the right, its end 137 and adjacent mass move into the displacement chamber 136 displacing liquid in the chamber 136 through the delivery channel 145 past the seat 146 and the ball 147 through the delivery chamber 144 and outlet orifice 150.

It will be understood that evacuation of the chamber urges the ball 147 toward its seat 146 when it displaces the ball 141 and, conversely, that displacement urges the ball 141 toward its seat 140 when it displaces the ball 147.

FIGS. 1–3 and 6 show the motor specially integrated with special purpose devices whereas FIGS. 4, 5, and 7 show the motor integrated in a housing which is easily adaptable for any use as the reciprocating link, is easily connected and the housing easily mounted or manually positioned.

Referring now to the novel control circuit which alternately energizes the opposed electromagnets or solenoids shown and described, FIGS. 8–11, a pair of wires 160 and 161 conduct alternating current from a source of supply, not shown, which may be 60 cycle as used in the United States or other cycles as used in other places. The alternating current flows in one direction and in the opposite direction in each wire 160 and 161 as indicated by the double arrows 162 and 163 on the cycle of the current such as 60 times per second.

The paired opposed electromagnets or solenoids are schematically shown as pole pieces 164 and 165 and coils 166 and 167 respectively. An armature 168 is shown between the pole pieces 164 and 165 and diagramatically illustrates the single and double armatures previously described as well as the combined armatures and links previously described. The motion take-off link is not shown but it will be understood that the link may be of any design.

The armature 168 is moved toward the pole piece 164 when the coil 166 is energized and is moved toward the pole piece 165 when the coil 167 is energized. The coil 165 is energized in one direction of alternating current flow and is not energized in the opposite direction of alternating current flow. The coil 166 is energized in the opposite direction of alternating current flow and is not energized in the one direction of alternating current flow. This is effected by a control circuit between the wires 160 and 161 and the coils 166 and 167 now described wherein the electrical one-way valves are shown with pointed ends indicating the direction in which the valve completes a circuit and with flat ends in the direction in which the valve blocks a circuit. The one direction of alternating current flow is referred to hereinafter as the "A" direction and the opposite flow direction is referred to hereinafter as the "B" direction.

FIG. 8 shows a circuit wherein a lead 170 directly connects the coil 166 to the wire 161 and a lead 171 directly connects the coil 167 to the wire 160. An electrical one-way valve 172 lies in a lead 173 between the wire 160 and the coil 166. An electrical one-way valve 174 lies in a lead 175 between the wire 161 and the coil 167. When alternating current flows in the "A" direction the valve 172 completes a circuit to the coil 166 and the valve 174 blocks a circuit to the coil 167. This energizes the coil 166 attracting the armature 168. When alternating current flows in the "B" direction the valve 172 blocks a circuit to the coil 166 and the valve 174 completes a circuit to the coil 167. This energizes the coil 167 attracting the armature 168. Thus the coils 166 and 167 are sequentially automatically alternately energized and alternately not energized oppositely relative to one another each time the direction of flow changes in the alternating current to alternately attract or drive the armature 168 in opposite reciprocating directions.

In FIG. 9, a lead 180 directly connects the coil 166 to the wire 160 and a lead 181 directly connects the coil 167 to the wire 160. A lead 182 connects to a bridge lead 183 between a one-way valve 184 and a one-way valve 185. A lead 186 connects the coil 166 to the valve 184 and a lead 187 connects the coil 167 to the valve 185. When alternating current flows in the "A" direction the valve 184 completes a circuit to the coil 166 and the valve 185 blocks a circuit to the coil 167 moving the armature 168 toward the coil 166. When alternating current flows in the "B" direction the valve 185 completes a circuit to the coil 167 attracting the armature 168 and the valve 184 blocks a circuit to the coil 166.

In FIG. 10, a lead 190 connects the coil 166 to the wire 161 and a lead 191 connects the coil 167 to the wire 161. A one-way valve 192 lies in a lead 193 connecting the coil 166 to the wire 160. A one-way valve 194 lies in a lead 195 connecting the coil 167 to the wire 160. When alternating current flows in the "A" direction, the valve 192 completes a circuit to the coil 166 attracting the armature 168 and the valve 194 blocks a circuit to the coil 167. When alternating current flows in the "B" direction, the valve 194 completes a circuit to the coil 167 attracting the armature 168 and the valve 192 blocks a circuit to the coil 166.

In FIG. 11, a bridge lead 200 connects both coils 166 and 167 to the wire 161. A one-way valve 201 lies in a lead 202 connecting the coil 166 to the wire 160. A one-way valve 203 lies in a lead 204 connecting the coil 167 to the wire 160. When alternating current flows in the "A" direction, the valve 201 completes a circuit to the coil 166 attracting the armature 168 and the valve 203 blocks a circuit to the coil 167. When alternating current flows in the "B" direction, the valve 203 completes a circuit to the coil 167 attracting the armature 168 and the valve 201 blocks a circuit to the coil 166.

From the foregoing description of the circuits of FIGS. 8–11 it will be understood that any one of the circuits or other like circuits may be employed with the motor shown in FIGS. 1–7, 12 and 13 as a component part of the novel linearly reciprocating motor.

While the circuit controlling devices have been referred to as electrical one-way valves, it will be understood that any means may be employed which selectively passes current to one coil and the other coil alternately with the change in direction of flow of alternating current. Thus diodes and other tubes, rectifiers, transistors, and the like may be used in circuits to effect the desired results.

While springs have been shown in all the embodiments of the novel motor it will be understood that they are so shown to increase the efficiency of a long travel linearly reciprocating motor. However, the springs may be deleted as the motor and circuits are operable without the springs. Obviously the motor is useable as a short linear travel device if desired.

FIGS. 11 and 12 show the long linear reciprocating travel of the novel motor wherein the springs 54 increase the efficiency, power, initial response, and terminal damping so that response and power are leveled out over the long linear travel in both reciprocating directions of travel.

While only a few embodiments of the novel motor, only a few integration with driven devices, and only a few uses have been shown and described in detail, it is obvious that many changes may be made in the size, shape, detail and arrangements of the various elements of the invention within the scope of the appended claims.

I claim:
1. In a linearly reciprocable alternating current electric motor, a first electromagnet having an energizeable first coil, a second electromagnet having an energizeable second coil, means supporting said electromagnets in spaced-apart relationship, spaced armatures disposed between said electromagnets, spring means for supporting said armatures spaced from said electromagnets, elongated knife blade means, means for securing the ends of the knife blade means to said armatures for endwise movement between said electromagnets, a circuit having conductors for connecting both said coils to a source of alternating current supply, a first electrical one-way valve interposed in the circuit to said first coil to pass current thereto in one direction of current flow and to block current in the opposite direction of current flow, and a second electrical one-way valve interposed in the circuit to said second coil to pass current thereto in said opposite direction of current flow and to block current in said one direction of current flow.

2. In a linearly reciprocable alternating current electric motor as recited in claim 1 wherein a platform for supporting material to be sliced is reciprocable toward and from said knife blade means at right angles to the endwise movement thereof.

3. In a linearly reciprocable alternating current electric motor as recited in claim 2 wherein adjusting means is provided between the support for the electromagnets and the platform by which the platform is spaced relative to the blade to control the thickness of the slices which are severed by the knife blade means.

References Cited by the Examiner
UNITED STATES PATENTS

| Re. 19,817 | 1/1936 | Wurzbach et al. | 310—29 |
| 1,948,452 | 2/1934 | Young | 310—29 |
| 2,145,711 | 1/1939 | Critchfield et al. | 310—29 |
| 2,349,656 | 5/1944 | Gulliksen | 318—125 |

FOREIGN PATENTS 1,192,094   4/1959   France.

MILTON O. HIRSHFIELD, *Primary Examiner.*

MAX L. LEVY, *Examiner.*

C. W. DAWSON, D. F. DUGGAN, *Assistant Examiners.*